June 1, 1926.
I. ZBAR
1,586,728
PORTABLE ELECTRIC CURRENT GENERATING PLANT
Filed April 4, 1925
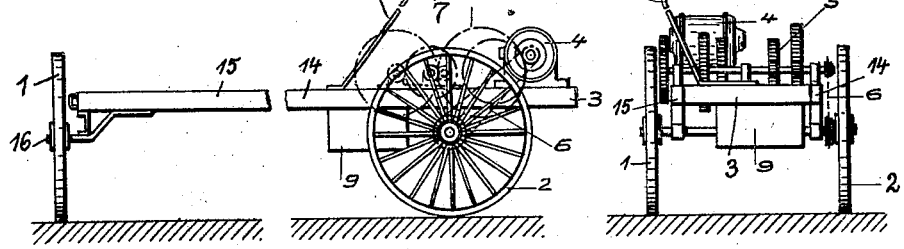
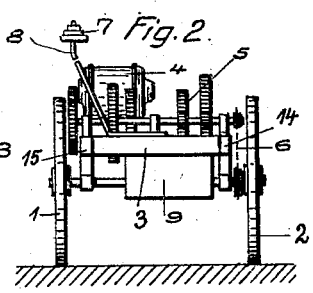
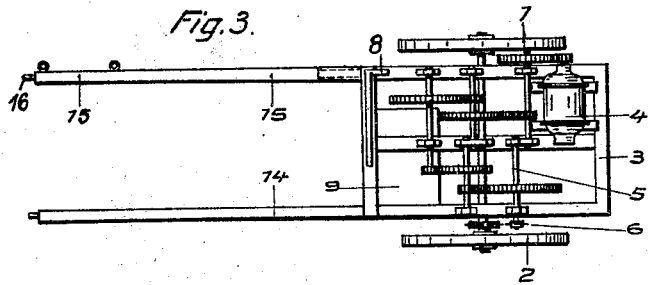
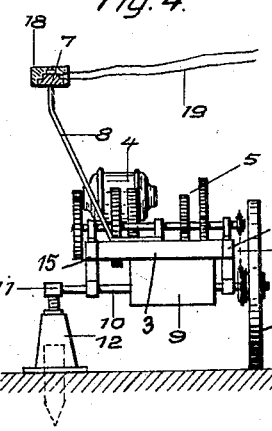
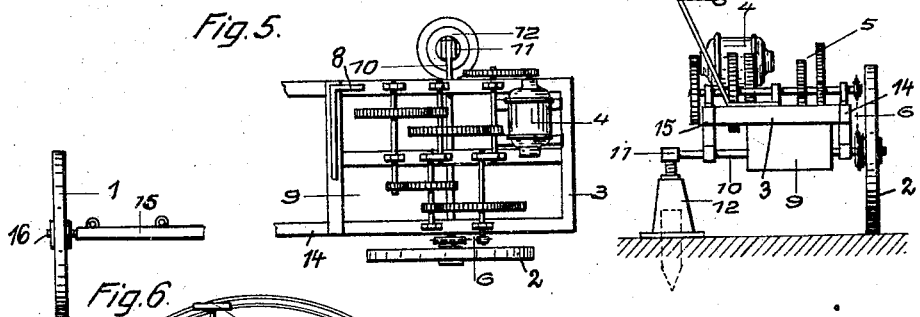
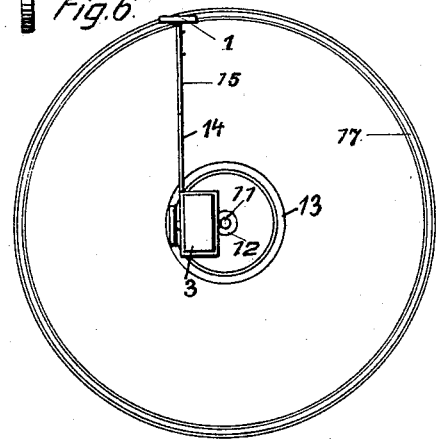
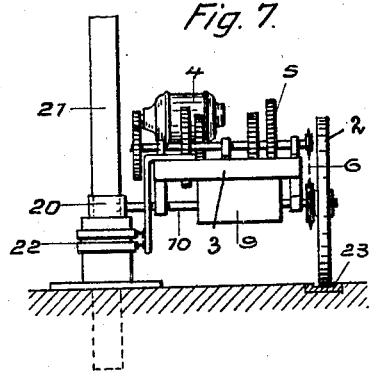
Inventor:
Isidor Zbar
by [signature] Atty.

Patented June 1, 1926.

1,586,728

UNITED STATES PATENT OFFICE.

ISIDOR ZBAR, OF LEIPZIC-NEUSCHONEFELD, GERMANY.

PORTABLE ELECTRIC-CURRENT-GENERATING PLANT.

Application filed April 4, 1925, Serial No. 20,718, and in Germany April 26, 1924.

My invention relates to electric current generating plants and more especially to plants of comparatively small size which are readily portable and are especially fit for use in the generation of electric current for agricultural and other purposes.

To this end I arrange a generator on a two-wheeled car and so connect the generator with one of the wheels of the car that its armature is rotated when the car is moved.

In this manner I provide a power plant by which electric energy can be generated practically everywhere and which can be operated by human or animal power and, if desired, can be used as a stationary plant.

In the drawings affixed to this specification and forming part thereof a device embodying my invention is illustrated diagrammatically by way of example. In the drawings Fig. 1 is an elevation,
Fig. 2 is a front end view, and
Fig. 3 is a plan view.
Figs. 4 and 5 are a plan and front end elevation, respectively, of the car converted into a stationary plan.
Fig. 6 is a diagrammatic plan view, drawn to a smaller scale, and
Fig. 7 is an end elevation of a modification.

Referring to the drawings, 4 is a generator mounted on a car 3 equipped with two wheels 1 and 2 on an axle 10 and poles 14 and 15. The armature of the generator is coupled for rotation with one of the wheels through the medium of a speed-up gear 5. The gear may be actuated by one or the other wheel, as desired, by means of a chain 6 or some other suitable mechanism. Clutches (not shown) may be provided for throwing out the generator 4. The electric energy can either be stored in a storage battery 9 or it can be conducted to a rod 8 carrying a trolley or an insulator 7. Obviously, the storage battery 9 may also be connected with the contact rod 8.

If it is desired to use the car as a stationary plant, one of its wheels is removed and the free end of the axle 10 is inserted in a bearing 11 rotatable in a bracket 12 (Fig. 4). The pole 15 can be detached from the car body and mounted on the end of the other pole (14). The spare wheel 1 is then placed on a journal 16 at the end of the pole 15. Preferably circular tracks 13 and 17 are laid out for each wheel, as shown in Fig. 6. In this manner the plant is converted into a sort of capstan and the animal attached to it moves in a circle of large radius. Obviously, if the pole 14 is long enough, the detachable pole 15 may be dispensed with, and the journal 16 may be arranged at the end of the pole 14.

The end of the contact rod 8 is bent so as to extend vertically above the centre of the tracks 13 and 17. The end of the rod can have a rotatable cap 18 mounted thereon to support the conductors free of the ground.

If it is desired to convert the car into a permanent stationary power plant, this may be effected as shown in Fig. 7. In this case one end of the axle 10 is secured to a sleeve 20 capable of rotating about a pillar 21 anchored in the ground. The wheel 2 runs on a circular track 23 and the current is collected by slip rings at 22 which may be mounted below the axle 10, as shown, or above it, or on the ground.

I wish it to be understood that I do not desire to be limited to the exact details of construction shown and described, for obvious modifications will occur to a person skilled in the art.

I claim:—

1. Electric current generating plant comprising a car, two car wheels, one being detachable, means connecting said wheels to said car, a bearing adapted to be fixed to the ground and to support one side of said car for rotation about said bearing in a horizontal plane, a dynamo on said car and means for transmitting rotation from a car wheel to said dynamo.

2. Electric current generating plant comprising a car, two car wheels, one being detachable, means connecting said wheels to said car, a bearing adapted to be fixed to the ground and to support one side of said car for rotation about said bearing in a horizontal plane, a dynamo on said car, means for transmitting rotation from a car wheel to said dynamo, a pole mounted on said car in the longitudinal direction thereof and a wheel journal at the end of said pole.

3. Electric current generating plant comprising a car, two car wheels, one being detachable, means connecting said wheels to said car, a bearing adapted to be fixed to the ground and to support one side of said car for rotation about said bearing in a horizontal plane, a dynamo on said car, means for transmitting rotation from a car wheel to said dynamo, a pole mounted on said car in the longitudinal direction thereof, another pole detachably mounted on said car and means for attaching said other pole to the free end of said first pole.

4. Electric current generating plant comprising a car, two car wheels, one being detachable, means connecting said wheels to said car, a bearing adapted to be fixed to the ground and to support one side of said car for rotation about said bearing in a horizontal plane, a dynamo on said car, means for transmitting rotation from a car wheel to said dynamo, a pole mounted on said car in the longitudinal direction thereof, another pole detachably mounted on said car, means for attaching said other pole to the free end of said first pole and a wheel journal at the end of said pole.

5. Electric current generating plant comprising a car, two car wheels, one being detachable, means connecting said wheels to said car, a bearing adapted to be fixed to the ground and to support one side of said car for rotation about said bearing in a horizontal plane, a dynamo on said car, means for transmitting rotation from a car wheel to said dynamo, a pole mounted on said car in the longitudinal direction thereof, a wheel journal at the end of said pole and a supporting rod for the conductors mounted on said car with its upper end vertically above said detachable wheel.

In testimony whereof I affix my signature.

ISIDOR ZBAR.